United States Patent [19]

Alberino et al.

[11] Patent Number: 4,546,114
[45] Date of Patent: Oct. 8, 1985

[54] PROCESS FOR THE PREPARATION OF POLYUREA ELASTOMERS

[75] Inventors: Louis M. Alberino, Cheshire; Dale F. Regelman, Wallingford; Nancy P. Vespoli, Guilford, all of Conn.

[73] Assignee: The Upjohn Company, Kalamazoo, Mich.

[21] Appl. No.: 664,820

[22] Filed: Oct. 25, 1984

[51] Int. Cl.$^4$ ............................................. C08G 18/14
[52] U.S. Cl. ....................................... 521/51; 264/51; 264/328.1; 528/64; 528/76; 528/77; 528/83
[58] Field of Search ................. 264/51, 328.1; 521/51; 528/64, 76, 77, 83

[56] References Cited

U.S. PATENT DOCUMENTS

| | | | |
|---|---|---|---|
| 4,098,773 | 7/1978 | Illers et al. | 528/65 |
| 4,218,543 | 8/1980 | Weber et al. | 521/51 |
| 4,272,618 | 6/1981 | Dominguez et al. | 521/160 |
| 4,296,212 | 10/1981 | Ewen et al. | 521/163 |
| 4,374,210 | 2/1983 | Ewen et al. | 521/159 |
| 4,433,067 | 2/1984 | Rice et al. | 521/51 |
| 4,442,235 | 4/1984 | Taylor et al. | 521/122 |

OTHER PUBLICATIONS

McBrayer et al., J. of Cellular Plastics, Jul./Aug. 1977 p. 255.

Primary Examiner—Maurice J. Welsh
Attorney, Agent, or Firm—James S. Rose; L. Ruth Hattan

[57] ABSTRACT

An improved process for the reaction injection molding of high flexural modulus polyurea containing elastomers is disclosed. Elastomers of this type when prepared at the prior art molding temperatures are brittle and can shatter like glass while still in the mold. The same elastomers when molded at a temperature of from about 90° to about 220° C. are not at all brittle. These elastomers are also characterized by the other advantageous properties inherent in polyurea elastomers such as high tensile strength, high hardness, and good heat resistance.

The improved RIM process finds particular utility in the preparation of auto parts such as panels, engine hoods, and the like.

18 Claims, No Drawings

PROCESS FOR THE PREPARATION OF POLYUREA ELASTOMERS

BACKGROUND OF THE INVENTION

1. Field of the Invention

This invention relates to reaction injection molded (RIM) polyurea containing elastomers and is more particularly concerned with improvements in the RIM processing of high flexural modulus elastomers containing polyurea linkages and the improved products obtained thereby.

2. Description of the Prior Art

U.S. Pat. No. 4,218,543 provides a comprehensive review of the prior art relating to the preparation of polyurethane-polyureas by the RIM processing of organic polyisocyanates, polymeric polyols and various polyamine extenders particularly of the type exemplified by diethyl toluene diamine (DETDA). This review is incorporated herein by reference.

Improvements in the production of elastomeric polyurethane-polyurea polymers by the RIM technique have been reported in U.S. Pat. No. 4,296,212 and 4,374,210 which disclose the use of extender blends of diamines with glycols and the use of isocyanate terminated prepolymers respectively. Additionally, the replacement of the polymeric polyol component by amine terminated polyethers has resulted in polyurea elastomers having improved heat resistance (see U.S. Pat. No. 4,433,067).

The stiffness (flexural modulus) of the polyurea containing elastomers is directly proportional to the concentration of the amine extender (e.g. DETDA) which is employed. Unfortunately, as the DETDA concentration is increased to raise the flexural modulus values the resultant RIM parts become unacceptably brittle at demold. In some cases, post-curing will reduce the brittleness somewhat.

U. S. Pat. No. 4,442,235 sets forth means for overcoming the brittleness of high flexural modulus polyurea elastomers by replacing the prior art amine extenders including DETDA with 1,3,5-triethyl-2,6diaminobenzene. However, the improvements in brittle behaviour of the products so obtained are not readily apparent from the disclosure of this patent, and in any case, the method is limited to the use of the single diamine species.

Dominguez et al (U.S. Pat. No. 4,272,618) disclose the curing of RIM polyurethane parts after demold at temperatures which are higher than previously employed (i.e. up to 218° C.). However, the extenders employed were glycols not diamines and glycol extended high flexural modulus polyurethanes do not present the brittleness problems that the diamine extended polyureas do in the as-molded state.

The maximum temperatures to which RIM molds have been heated in the past, regardless of whether the formulation is a straight polyurethane or a polyurethane high in polyurea content, have not been in excess of about 100° C. and preferably not in excess of 70° C. In fact, it has long been felt that mold temperature had little or no effect on most properties of RIM elastomers; see McBrayer et al., J. of Cellular Plastics, July/August 1977, p. 255. It is old in the art to cast non-RIM prepared polyurethane elastomer forming ingredients into molds and heat the molds to effect the polymerization reaction in the mold. U.S. Pat. No. 4,098,773 discloses a typical procedure wherein an isocyanate prepolymer, an aromatic diisocyanate, and a diol extender are cast into a mold and heated at up to 200° C. for extended periods (i.e. 24 hours).

We have now discovered that high flexural modulus diamine extended polyurea RIM formulations when processed in molds at temperatures above the prior art ranges produce parts which overcome the prior art problem of brittleness at the demold stage.

SUMMARY OF THE INVENTION

This invention comprises an improved process for the preparation of high flexural modulus elastomers containing polyurea linkages by the reaction injection molding of (i) an organic polyisocyanate, (ii) an organic compound having at least two active hydrogen containing groups and a molecular weight of from about 1500 to about 12,000, and (iii) an aromatic diamine extender wherein at least one of the positions ortho to each amine group of said diamine is substituted by a lower alkyl group, wherein the improvement comprises injecting the above ingredients into a mold at a temperature of from about 90° to about 220° C. and holding thereat for a time sufficient to achieve an improvement in the brittle properties on demold of said molded elastomer.

The invention also comprises the high flexural modulus elastomers containing polyurea linkages prepared in accordance with the above process.

The term "high flexural modulus elastomers" means elastomers having a flexural modulus of at least 70,000 psi when measured at ambient room temperature (about 20° to 25° C.) in accordance with ASTM Test Method D-790.

DETAILED DESCRIPTION OF THE INVENTION

The improved RIM process of the invention can be practiced using any of the RIM procedures, apparatus, and appropriate ingredients set forth in the prior art for the preparation of molded elastomers containing sufficient polyurea linkages to impart high flexural modulus properties thereto. Primarily, the molded elastomers are of the types which have a predominance of polyurea and polyurethane-polyurea linkages in the polymer backbone. Generally speaking, the room temperature flexural modulus of these elastomers as measured by the above defined test have values falling within the range of about 70,000 to about 300,000 psi.

For illustrative and detailed teaching in regard to the RIM preparation of such molded materials including the reactants and molding procedures, reference is made to the prior art cited supra. Particular reference in this regard is directed to U.S. Pat. No. 4,272,618; 4,296,212; 4,374,210 and 4,433,067 whose disclosures are hereby incorporated herein by reference, and U.S. Pat. No. 4,218,543 whose disclosure is already incorporated herein.

As previously noted, the RIM molded polyurea elastomers of high flexural modulus prepared at the prior art mold temperatures are brittle. Although a part molded in any size suffers from this brittleness, for most test purposes the mold size employed herein was 10 inches by 18 inches by ⅛". This brittleness is manifested either in the cracking or shattering of the elastomer part in the mold prior to, or during, its opening. Alternatively, if the part is intact after demolding it breaks easily when flexed manually.

The novelty in the present process resides in the temperature at which the RIM mold is heated and the time for which the polyurea part is held in the mold at that temperature, i.e. the demold time. Under the conditions of the present process the polyurea parts do not shatter or crack in the mold and either cannot be broken at all upon manual flexing or else broken only with great difficulty.

The temperature of the mold is advantageously from about 90° to about 220° C., preferably from about 100° to about 200° C., and, most preferably, from about 110° to about 190° C.

The demold time will vary depending on such factors as the mold temperature employed, the extent of the polyurea content of the polymer, the mold size, and the like. Generally speaking, the thicker the molded part the longer will be the demold time. Conversely, the higher the temperature then the shorter the time. The optimum time for any given set of conditions is easily determined by experiment. However, the primary determining factor is the attainment of the improvement in the brittleness of the molded part.

Accordingly, the time which the molded part is held within the temperature ranges set forth above should be sufficient to achieve an improvement in the brittle properties of the part as described above. That is to say, the part does not shatter or crack in the mold and once removed is either unbreakable or broken only with great difficulty when manually flexed in the form of a ⅛" thick section.

Although not wishing the present invention to be limited by any particular demold times but only by the improvement in brittle qualities for the molded part set forth above, the advantageous demold times fall within the range of from about 3 seconds to about 5 minutes.

The polyisocyanates to be used in accordance with the present invention can be any of the organic di- or higher functionality polyisocyanates known to those skilled in the RIM art and include those polyisocyanates disclosed in the patents incorporated herein by reference. The preferred class of polyisocyanates are the aromatic polyisocyanates.

Illustrative, but not limiting thereof, are m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 20 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of MW 1000 to 10,000, polytetramethylene glycols of MW 600 to 5000, and polyester polyols of MW 500 to 8000, said polyol and said methylenebis(phenyl isocyanate) being reacted in the proportions of about 0.01 equivalent to about 0.5 equivalent of said polyol per isocyanate equivalent in accordance with U.S. Pat. No. 4,374,210 whose disclosure is already incorporated herein; also falling within the preferred group of polyisocyanates are blends or mixtures of any of the above polyisocyanates and particularly mixtures of the liquefied methylenebis(phenyl isocyanates) with each other and with the isocyanate terminated prepolymers described above in any proportions desired.

The organic compounds having at least 2 active hydrogen groups and a molecular weight from about 1500 to about 12,000 include the polymeric polyols and polymeric polyamines disclosed in the patents cited supra and incorporated herein by reference.

It will be obvious to one skilled in the art that when polyols are employed in the present process the resulting molded elastomer contains polyurethane linkages along with polyurea linkages arising from the diamine extender. In the event that the polyamines are the ingredients chosen then the elastomer would contain primarily polyurea linkages derived both from the polymeric polyamine and the extender. The present process also includes the use of mixtures of the polyols with the polyamines.

In respect of the polymeric polyol component, the functionality is, generally speaking, from about 2 to about 4 with the hydroxyl functionality predominantly primary. Preferably, the polyols have functionality of about 2 to about 3 and MW from about 2000 to about 8000.

A preferred group of polyols comprises the polypropyleneoxy-polyethyleneoxy capped diols and triols obtained by the alkoxylation of water, ammonia, ethylene glycol, propylene glycol, trimethylolpropane, glycerine, aniline, ethanolamine, and the like; polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols or copolymers thereof; and the vinyl-resin reinforced propyleneoxyethyleneoxy capped diols and triols, particularly those polyethers reinforced with polyacrylonitrile.

In respect of the polymeric polyamine component, the functionality is, generally speaking, from about 2 to about 4 of primary and/or secondary amine terminated polymers, preferably primary amine terminated polyethers. Preferably, the primary amine terminated polyethers have a functionality of about 2 to about 3 and MW from about 2000 to about 6000.

The preferred group of polyamines are the predominantly primary amine terminated polyethyleneoxy-polypropyleneoxy polyethers having the preferred MW and functionality range set forth above.

The aromatic diamine extender component includes any of the aromatic diamines disclosed in the art cited supra which fall within the definition set forth above. Preferably, all of the ortho positions to each amino group are substituted by a lower alkyl group.

A preferred group includes 1-methyl-3,5-diethyl-2,4-diaminobenzene, 1-methyl-3,5-diethyl-2,6-diaminobenzene, and mixtures of these two in varying proportions (referred to as DETDA), 3,3',5,5'-tetraisopropyl-4,4'-diaminodiphenylmethane, 1,3,5-triethyl-2,6-diaminobenzene, and the like. A particularly preferred extender is the DETDA mixture.

The proportions with which the above ingredients are reacted in accordance with the present process can vary widely. Advantageously, the aromatic diamine extender is employed in the proportions such that it comprises from about 25 to about 60 percent by weight based on the combined weights of the polymeric polyol or polyamine and the diamine extender. Preferably, it comprises from about 27 to about 55 percent.

It is within the scope of this process to include a minor amount of an aliphatic chain extender diol having a MW of 60 to 400 such as ethylene glycol, 1,3-propylene glycol, 1,2-propylene glycol, 1,4-butanediol, hexanediol, and the like. In the event that such diol extenders are employed they advantageously comprise up to about 40 percent by weight of the combined weights of (ii), (iii), and diol extender provided that the weight of (iii) and diol extender together does not exceed 65 percent by weight of the overall total weight.

The proportions of polyisocyanate (i) to the total active hydrogen equivalents comprised of (ii) and (iii), and any optional aliphatic diol extender are such that the ratio of isocyanate equivalents of the total active hydrogen equivalents falls within a range of from about 0.95 to about 1.15, preferably from about 0.98 to about 1.05.

Optionally, a catalyst for the reaction of isocyanate groups with the reactive hydrogen containing compounds can be employed. Any of the catalysts disclosed in the art supra can be employed in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N'N'-tetramethylethylenediamine, N-methylmorpholine, N,N-dimethylcyclohexylamine, and the like, and mixtures of the above in any combination.

Generally speaking, the catalyst or mixture of catalysts, if employed, will fall within a range of from about 0.01 percent by weight to about 5 percent by weight based on the total weight of all the ingredients.

Optionally, blowing agents may be employed wherein compact tough skinned surfaces are desired. Any of the blowing agents known in the art can be used including water and the fluorocarbon blowing agents. Also, inert gases (e.g. nitrogen, argon, and the like) may be introduced to provide whatever degree of blowing is desired from micro-cellular to macro-cellular in nature.

Other optional additives such as dispersing agents, cell stabilizers, surfactants, internal mold release agents, flame retardants, colorants, reinforcing agents, fiber glass, and the like can be added to the RIM ingredients in accordance with the present process.

The molded elastomers prepared in accordance with this process are characterized by very much improved brittle strength on demold over prior art prepared polyurea elastomers. Further, the products are characterized by the well known excellent physical properties of molded polyurea containing elastomers such as high tensile strength, hardness, heat resistance, flexural modulus, and the like. In particular, flexural modulus and heat resistance are much higher than formerly possible because of the high level of diamine extender in the formulation which previously could not be molded due to problems of brittleness. The molded parts find a wide range of utility particularly in the molding of auto parts such as car bumpers, body elements, panels, doors, engine hoods, skirts, air scoops, and the like.

The following examples describe the manner and process of making and using the invention and set forth the best mode contemplated by the inventors of carrying out the invention but are not to be construed as limiting.

EXAMPLE 1

The following experiment describes the RIM preparation of a high flexural modulus polyurethane-polyurea containing elastomer in accordance with this invention (run 3) and two comparison elastomers (runs 1 and 2) not so in accordance. A pilot plant scale RIM machine was employed along with the ingredients in the proportions in parts by weight set forth in Table I.

One tank of the RIM machine was charged with the A component (at 100° F.) while a second tank was charged with the B component (120° F.). Metering pumps from each tank were used to deliver the ingredients into the impingement mixing head of the RIM machine. After mixing, the reaction mixture was directed into a metal mold measuring 10 inches × 18 inches × 1/8 inch. The only variable between the runs was the temperature of the metal mold and demold time.

In run 1 which had the mold temperature of 68° C. in accordance with the prior art, the molded part was found to have shattered like glass when the mold was opened. In run 2, although the mold temperature was very much higher than prior art values, the demold time of 2 minutes was too short because the sample was still brittle. While it did not shatter in the mold, it did break when manually flexed.

In the case of run 3 which had the same mold temperature as run 2 but the longer demold time of 5 minutes, the part was not brittle and could not be broken by manual flexing. Accordingly, the part was post-cured and observed to have the good properties for a high flexural modulus part as set forth in Table I.

TABLE I

| Run | 1 | 2 | 3 |
|---|---|---|---|
| Ingredients (parts by wt.): | | | |
| Component A: | | | |
| Isocyanate I[1] | 128.8 | 128.8 | 128.8 |
| Component B | | | |
| SF 6503[2] | 100 | 100 | 100 |
| DETDA[3] | 58.5 | 58.5 | 58.5 |
| UL-28[4] | 0.2 | 0.2 | 0.2 |
| NCO Index | 1.0 | 1.0 | 1.0 |
| % Hard Segment | 62 | 62 | 62 |
| A/B Ratio | 0.81 | 0.81 | 0.81 |
| Mold Temp. (°C.) | 68° | 149° | 149° |
| Demold Time (mins.) | 1 | 2 | 5 |
| Brittleness[5] | shattered in mold | broken manually | cannot be broken manually |
| Postcure | — | — | 121° C./1 hr. |
| Properties | | | |
| Density, g/cc | — | — | 1.144 |
| Hardness Shore D | — | — | 70 |
| Tensile str., psi | — | — | 5660 |
| % Elongation | — | — | 130 |
| Flexural modulus, psi | — | — | 137,150 |

TABLE I-continued

| Run | 1 | 2 | 3 |
|---|---|---|---|
| Flexural str., psi | — | — | 6960 |

Footnotes to Table I
[1]Isocyanate I: is a liquefied methylenebis (phenyl isocyanate) prepared from 4,4'-methylenebis (phenyl isocyanate) and a mixture of a minor amount of dipropylene glycol and tripropylene glycol (equal parts by weight) wherein the total hydroxyl equivalents was about 0.2 per equivalent of MDI; I.E. = 181.
[2]SF 6503: a 6000 MW polypropyleneoxy-polyethyleneoxytriol, OH EW = 2100 (supplied by Texaco Chemical Co.).
[3]DETDA: a mixture of 80/20 percent by weight of 1-methyl-3,5-diethyl-2,4-diaminobenzene and 1-methyl-3,5-diethyl-2,6-diaminobenzene respectively.
[4]UL-28: a tin catalyst which is a dibutyl tin dialcoholate (supplied by Witco Chemical Corp.)
[5]Brittleness: Samples not in accordance with the invention, in their worst aspect, will be observed to have cracked or even shattered like glass either prior to or during the opening of the mold (at ¼" thickness); in their best aspect they can be demolded but upon flexing manually they will easily crack. Samples in accordance with the invention in their worst aspect are very difficult to break by manual flexing and in their best aspect cannot be broken at all by the manual test.

properties decrease. However, time also plays a factor as can be seen by the data below. Run 4 at a mold temperature of 68° C. was easily broken on demold. When the temperature was raised to 93° C. in run 5 the molded part was difficult to break and increasing the demold time to 5 minutes provided a molding which was good (i.e. could not be broken). As the mold temperature went over 100° C. in run 7, a demold time of 2 minutes was sufficient to provide an unbreakable molding. However, even at 104° C. in run 8 a 30 second demold time was too short as the sample was easily broken. When the mold temperature was increased to 115° C. then 30 seconds was sufficient to yield a molding which broke only with difficulty. At the 124°–127° range the 30 second period was adequate to provide a part which could not be broken at all.

TABLE II

| Run | 4 | 5 | 6 | 7 | 8 | 9 | 10 | 11 | 12 |
|---|---|---|---|---|---|---|---|---|---|
| Ingredients (parts by wt.): | | | | | | | | | |
| Component A | | | | | | | | | |
| Isocyanate I | 39 | → | → | → | → | → | → | → | → |
| Isocyanate II[1] | 58 | → | → | → | → | → | → | → | → |
| Component B | | | | | | | | | |
| Jeffamine T-5000[2] | 100 | → | → | → | → | → | → | → | → |
| DETDA | 42 | → | → | → | → | → | → | → | → |
| NCO Index | 1.0 | → | → | → | → | → | → | → | → |
| % Hard Segment | 50 | → | → | → | → | → | → | → | → |
| A/B Ratio | 0.68 | → | → | → | → | → | → | → | → |
| Mold Temp. (°C.) | 68 | 93 | 91–93 | 99–104 | 104 | 104 | 107–110 | 115 | 124–127 |
| Demold time (min:secs) | 2:00 | 2:00 | 5:00 | 2:00 | 0:30 | 1:00 | 2:00 | 0:30 | 0:30 |
| Brittleness | easily broken | difficult to break | good | good | easily broken | good | good | very difficult to break | good |
| Postcure | — | — | — | — | — | — | — | — | 149° C./1 hr. |
| Properties: | | | | | | | | | |
| Density g/cc | — | — | — | — | — | — | — | — | 1.1 |
| Hardness Shore D | — | — | — | — | — | — | — | — | 60 |
| Notched Izod Impact, ft-lbs/in. | | | | | | | | | |
| at 20° C. | — | — | — | — | — | — | — | — | 7.5 |
| at −30° C. | — | — | — | — | — | — | — | — | 6.5 |
| Tensile str., psi | — | — | — | — | — | — | — | — | 3853 |
| % Elongation | — | — | — | — | — | — | — | — | 120 |
| Flexural Modulus, psi | — | — | — | — | — | — | — | — | 70,000 |
| Flexural Str., psi | — | — | — | — | — | — | — | — | 3686 |
| HDT[3] @ 264 psi, °C. | — | — | — | — | — | — | — | — | 70° C. |

Footnotes to Table II
[1]Isocyanate II: is a blend of (1) about 53 parts by wt. of a liquefied form of 4,4'-methylenebis (phenyl isocyanate) in which a portion of the isocyanate groups have been converted to carbodiimide (I.E. = 143); and (2) an isocyanate terminated prepolymer prepared from the reaction of about 25 parts of a methylenebis (phenyl isocyanate) [comprising about 89% of the 4,4'-isomer and 11% of the 2,4'-isomer] and 22 parts of a 5000 MW polypropyleneoxypolyethyleneoxy triol having about 18 to about 19 percent by wt. E.O. content and about 85% primary hydroxyl groups, with OH EW = about 1626; isocyanate equiv. wt. of the blend = 180.
[2]Jeffamine T-5000 is a polypropyleneoxy polyamine of about 5000 MW and having about three primary amine groups.
[3]Heat deflection temperature is determined in accordance with ASTM Test Method D648.

EXAMPLE 2

Using the same apparatus and procedure described in Example 1 but the ingredients in the proportions of parts by weight set forth in Table II below there were prepared seven polyurea elastomers in accordance with the present process (runs 5 through 7, and 9 through 12) and two comparison preparations in runs 4 and 8.

The use of the Jeffamine T-5000 in combination with DETDA provided for a predominance of polyurea linkages in this series of molded elastomers. The only urethane linkages arise from the urethanes present in the isocyanate components (see footnotes for the Isocyanate I and II components in Table I and II respectively).

It can be seen from the results of the brittleness observations that as the temperature increases the brittle

We claim:
1. In a process for the preparation of a high flexural modulus elastomer containing polyurea linkages by the reaction injection molding of (i) an organic polyisocyanate, (ii) an organic compound having at least two active hydrogen containing groups and a molecular weight of from about 1500 to about 12,000, and (iii) an aromatic diamine extender wherein at least one of the positions ortho to each amine group of said diamine is substituted by a lower alkyl group, the improvement which comprises injecting the above ingredients into a mold said mold being at a temperature of from about 110° to about 190° and holding thereat for a time sufficient to achieve an improvement in the brittle properties on demold of said molded elastomer.

2. A process according to claim 1 wherein said polyisocyanate (i) comprises an aromatic polyisocyanate.

3. A process according to claim 2 wherein said polyisocyanate comprises methylenebis(phenyl isocyanate).

4. A process according to claim 2 wherein said polyisocyanate is selected from the group consisting of (a) an isocyanate terminated prepolymer having an isocyanate content of about 9 to about 20 percent by weight and prepared from methylenebis(phenyl isocyanate), (b) a liquefied form of 4,4'-methylenebis(phenyl isocyanate), and mixtures of (a) and (b).

5. A process according to claim 1 wherein said organic compound (ii) comprises a polyol having a primary hydroxyl functionality of from about 2 to about 4.

6. A process according to claim 1 wherein said organic compound (ii) comprises a primary or secondary amine terminated polyether having an amine functionality of about 2 to about 4.

7. A process according to claim 1 wherein said aromatic diamine extender is selected from the group consisting of 1-methyl-3,5-diethyl-2,4-diaminobenzene, 1-methyl-3,5-diethyl,2,6-diaminobenzene, and mixtures thereof.

8. A process according to claim 1 wherein said aromatic diamine extender (iii) is present in an amount of from about 25 to about 60 percent by weight based on the combined weight of (ii) and (iii) and the ratio of isocyanate equivalents to the total active hydrogen equivalents of (ii) and (iii) is from about 0.95 to about 1.15.

9. A process according to claim 1 including a minor amount of an aliphatic chain extender diol having a MW of 60 to 400.

10. A process according to claim 1 wherein the demold time falls within the range of from about 3 seconds to about 5 minutes.

11. A process for the preparation of a high flexural modulus elastomer containing polyurea linkages said process comprising the reaction injection molding into a mold at a temperature of from about to about 110° to about 190° C. and holding thereat in said mold for a period of from about 3 seconds to about 5 minutes the following ingredients:
(i) an aromatic polyisocyanate selected from the group consisting of (a) isocyanate terminated prepolymers having an isocyanate content of about 9 to about 20 percent by weight and prepared from methylenebis(phenyl isocyanate), (b) a liquefied form of 4,4'-methylenebis-(pheynl isocyanate), and mixtures of (a) and (b);
(ii) an organic polyol or polyamine having a molecular weight of from about 1500 to about 12,000 and selected from the group consisting of polyols having a primary hydroxyl functionality of from about 2 to about 4, a primary or secondary amine terminated polyether having an amine functionality of about 2 to about 4, and mixtures of said polyol and polyamine;
(iii) a diamine extender selected from the group consisting of 1-methyl-3,5-diethyl-2,4-diaminobenzene, 1-methyl-3,5-diethyl-2,6-diaminobenzene, and mixtures thereof; and
(iv) optionally a catalyst for the reaction of isocyanate groups with the reactive hydrogen containing compounds
wherein said diamine extender is present in an amount of from about 25 to about 60 percent by weight based on the combined weight of (ii) and (iii) and the ratio of isocyanate equivalents to the total active hydrogen equivalents of (ii) and (iii) is from about 0.95 to about 1.15.

12. A process according to claim 11 wherein said polyisocyanate comprises a liquefied form of 4,4'-methylenebis(phenyl isocyanate).

13. A process according to claim 11 wherein said polyisocyanate comprises a mixture of said liquefied form of 4,4'-methylenebis(phenyl isocyanate) and an isocyanate terminated prepolymer having an isocyanate content of about 9 to about 20 percent by weight and prepared from methylenebis(phenyl isocyanate).

14. A process according to claim 11 wherein component (ii) comprises a polyol having a primary hydroxyl functionality of about 2 to about 3.

15. A process according to claim 11 wherein said component (ii) comprises a primary amine terminated polyether having an amine functionality of about 2 to about 3.

16. A process according to claim 11 wherein said polyisocyanate (i) comprises a liquefied form of 4,4-methylenebis(phenyl isocyanate) which has been reacted previously with from about 0.04 to about 0.2 equivalent per isocyanate equivalent of a diol selected from dipropylene glycol, tripropylene glycol and mixtures thereof; and (ii) comprises a polyoxyethylene-polyoxypropylene triol of MW of about 4000 to about 7000.

17. A process according to claim 11 wherein said polyisocyanate (i) comprises a mixture of (1) a liquefied form of 4,4'-methylenebis(phenyl isocyanate) which has been reacted previously with from about 0.04 to about 0.2 equivalent per isocyanate equivalent of a diol selected from dipropylene glycol, tripropylene glycol and mixtures thereof, (2) a liquefied form of 4,4'-methylenebis(phenyl isocyanate) obtained by heating the latter with a carbodiimide forming catalyst to convert a portion of said 4,4'-methylenebis(phenyl isocyanate) to carbodiimide, and (3) an isocyanate terminated prepolymer prepared from 4,4'-methylenebis(phenyl isocyanate) and a polyoxyethylene-polyoxypropylene triol (MW of about 4500 to about 5500) said triol and said 4,4'-methylenebis(phenyl isocyanate) having been reacted in the proportions of about 0.01 to about 0.5 equivalent of the former per equivalent of the latter; and (ii) comprises a primary amine terminated polyether having an amine functionality of about 3 and MW about 4000 to 6000.

18. A high flexural modulus elastomer containing polyrea linkages prepared in accordance with claim 1.

* * * * *